US010258188B2

(12) United States Patent
Chang et al.

(10) Patent No.: US 10,258,188 B2
(45) Date of Patent: Apr. 16, 2019

(54) AUTOMATIC COOKING APPARATUS CAPABLE OF SUPPLYING DRINKING WATER

(76) Inventors: Ping-Hua Chang, Taichung (TW); Ting-Yi Tseng, Taichung (TW)

( * ) Notice: Subject to any disclaimer, the term of this patent is extended or adjusted under 35 U.S.C. 154(b) by 895 days.

(21) Appl. No.: 13/274,361

(22) Filed: Oct. 17, 2011

(65) Prior Publication Data
US 2012/0240786 A1  Sep. 27, 2012

(30) Foreign Application Priority Data

Mar. 25, 2011 (TW) .............................. 100110329 A

(51) Int. Cl.
*A47J 27/00* (2006.01)
*A47J 31/40* (2006.01)

(52) U.S. Cl.
CPC ................... *A47J 31/401* (2013.01)

(58) Field of Classification Search
CPC ...... A47J 31/402; A47J 31/401; A47J 31/404; A47J 31/40; A47J 31/54; A47J 31/542; A47J 31/547; A47J 31/56; A47J 33/00; A47J 36/00; A47J 36/022; A47J 36/02; A47J 36/06; A47J 36/08; A47J 36/14; A47J 27/00; A47J 27/14; A47J 37/12; A47J 43/24
USPC ......... 99/326, 325, 407, 484, 290, 403, 340, 99/339; 126/344
See application file for complete search history.

(56) References Cited

U.S. PATENT DOCUMENTS

| | | | | |
|---|---|---|---|---|
| 4,665,808 | A * | 5/1987 | Pulvermuller | A47J 31/40 222/66 |
| 5,094,153 | A * | 3/1992 | Helbling | A47J 31/52 99/280 |
| 5,156,082 | A * | 10/1992 | Fukuda | A47J 27/14 99/326 |
| 5,207,148 | A * | 5/1993 | Anderson | A47J 31/36 137/893 |
| 5,241,898 | A * | 9/1993 | Newnan | A47J 31/42 241/100 |
| 5,542,342 | A * | 8/1996 | McNeill | A47J 42/40 99/280 |
| 6,886,453 | B2 * | 5/2005 | Yamamoto | B02B 1/04 99/519 |
| 2006/0032381 | A1* | 2/2006 | Shiraishi | 99/330 |

(Continued)

FOREIGN PATENT DOCUMENTS

| | | | |
|---|---|---|---|
| JP | 04189306 | A * | 7/1992 |
| JP | 3017397 | U | 8/1995 |
| JP | 8-294449 | A | 11/1996 |

(Continued)

*Primary Examiner* — Tu B Hoang
*Assistant Examiner* — Diallo I Duniver
(74) *Attorney, Agent, or Firm* — Tsz Lung Yeung

(57) ABSTRACT

An automatic cooking apparatus capable of supplying drinking water is provided, and includes a drinking water tank, a drinking water supplying unit, a food storage, a cooking unit and a controller. The drinking water tank includes a drinking water sensor, a drinking water output tube, and a drinking water valve. The food storage includes a food sensor, a food output member and a food valve. The cooking unit includes a heater, a steam output member and a pot cover actuator. The controller controls the drinking water valve, the food valve, the heater and the pot cover actuator based on a user's instruction.

7 Claims, 16 Drawing Sheets

(56) References Cited

U.S. PATENT DOCUMENTS

2008/0092749 A1* 4/2008 Kim .......................... 99/329 P

FOREIGN PATENT DOCUMENTS

| JP | 9-108112 A | 4/1997 |
| JP | 2005-288010 A | 10/2005 |

* cited by examiner

AUTOMATIC COOKING APPARATUS CAPABLE OF SUPPLYING DRINKING WATER

RELATED APPLICATIONS

The application claims priority to Taiwan Application Serial Number 100110329, filed Mar. 25, 2011.

BACKGROUND

Field of Invention

The present invention relates to an automatic cooking apparatus. More particularly, the present invention relates to an automatic cooking apparatus capable of supplying drinking water.

Description of Related Art

Busy modern people are time-sensitive for work and life, thus purchasing a number of automatic cooking apparatuses, such as a microwave oven, a dishwasher, and a coffee machine etc. The most outstanding feature of the appliances is that a user almost only needs to use one button for enjoying the convenience and time saving brought by new technologies. However, for using an electrical rice-cooker or an electrical cooker for cooking some beans, cereals or other agricultural food products such as rice, bean soup etc., a measuring cup is still needed for measuring the amounts of food and water by manpower, which often causes inconvenience to single office workers or housewives who then would rather cook instant noodles or eat outside instead, thus resulting in difficultly promoting an automatic kitchen for cooking life.

The inconvenience of the conventional automatic cooking apparatus such as an electrical rice-cooker or an electrical cooker is caused by lacking of an automatic water supply apparatus, especially for a hot water supply equipment, and thus the user still needs to put cold water or hot water from a water heater into a cooking device by himself or herself while cooking food. Hence, there is a need to improve the automatic apparatus for the busy modern people.

SUMMARY

Therefore, an aspect of the present invention is directed to providing an automatic cooking apparatus capable of supplying drinking water. The automatic cooking apparatus capable of supplying drinking water includes a drinking water tank, a drinking water supply unit, a food storage, a cooking unit and a controller. The drinking tank includes a drinking water sensor, a drinking water output tube and a drinking water valve, wherein the drinking water sensor is disposed on a bottom-side surface of the drinking water tank, and the drinking water output tube is disposed under the drinking water tank, and the drinking water valve is disposed on the drinking water tube to control the drinking water tube. The drinking water supplying unit is connected to the drinking water tank and includes at least one drinking water outlet. The food storage includes a food sensor, a food output member and a food valve, wherein the food sensor is disposed on a bottom surface of the food storage, and the food output member is disposed under the food storage, and the food valve is disposed on the food output member to control the food output member. The cooking unit includes a heater and a steam output member. The heater is used for heating a pot placed thereon, wherein an opening of the pot is corresponding to the drinking water output tube and the food output member for receiving drinking water and food. The steam output member includes a steam output tube and an external steam output port. The controller is electrically connected to the drinking water sensor, the food sensor, the drinking valve, the food valve and the heater, wherein the controller receives a sense result from the drinking water sensor and the food sensor, and transmits a control signal to the drinking water valve, the food valve and the heater in accordance with an instruction of a user.

The automatic cooking apparatus capable of supplying drinking water further includes a partition, wherein the partition can form a confined space with a flange of the pot, thereby achieving a function similar to a pot cover.

The automatic cooking apparatus capable of supplying drinking water further includes a pot cover actuator electrically connected to and controlled by the controller, wherein the pot cover actuator is used for actuating a pot cover to cover and close the pot, and the pot cover corresponding to an opening of the pot has a first hole connected with the steam output tube. Furthermore, the pot cover actuator is a single-arm transmission mechanism, and a movement of the pot cover is an arc swing path.

The automatic cooking apparatus capable of supplying drinking water further includes a pot cover actuator electrically connected to and controlled by the controller, wherein the pot cover actuator is used for actuating a pot cover to cover and close the pot, and the pot cover corresponding to an opening of the pot has a first hole connected with the steam output tube, a second hole connected with the drinking water output tube, and a third hole connected with the food output member. Furthermore, the pot cover actuator belongs to a power transmission mechanism, and a movement of the pot cover is a vertical path.

Continued from the above, the automatic cooking apparatus capable of supplying drinking water further includes a pot sensor, wherein the pot sensor is disposed on the heater and under the pot to sense a weight of the pot, and is electrically connected to the controller so as to return the weight of the pot to the controller.

Continued from the above, the automatic cooking apparatus capable of supplying drinking water further includes a pot sensor, wherein the pot sensor senses a position of the pot, and is electrically connected to the controller so as to return the position of the pot to the controller.

Continued from the above, the automatic cooking apparatus capable of supplying drinking water further includes a door plate and a door sensor, wherein the door sensor senses a door plate state of the door plate, and is electrically connected to the controller so as to return the door plate state to the controller.

The controller implemented by an electronic circuit includes a display screen and a control panel on which the user can enter the instruction. The heater has a heating mode and a warming mode.

Therefore, the automatic cooking apparatus capable of supplying drinking water provided by the present invention can directly introduce in required water by using a simple controller (even only using a button) to intelligently control the ratio of food and water during cooking, thereby achieving a convenient, time-saving and delicious cooking.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
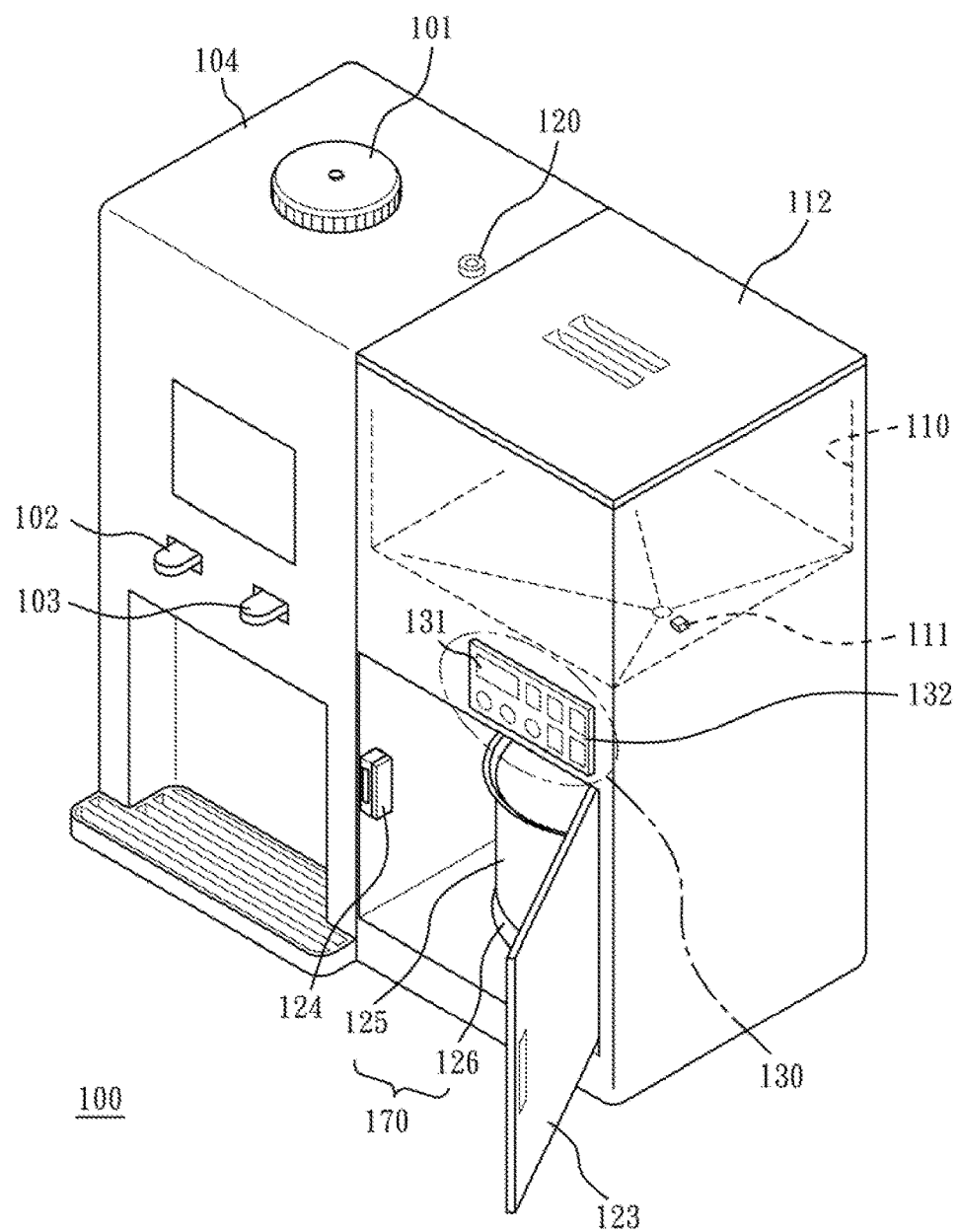
FIG. 1 is a schematic three-dimensional view showing an appearance of an automatic cooking apparatus capable of supplying drinking water according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
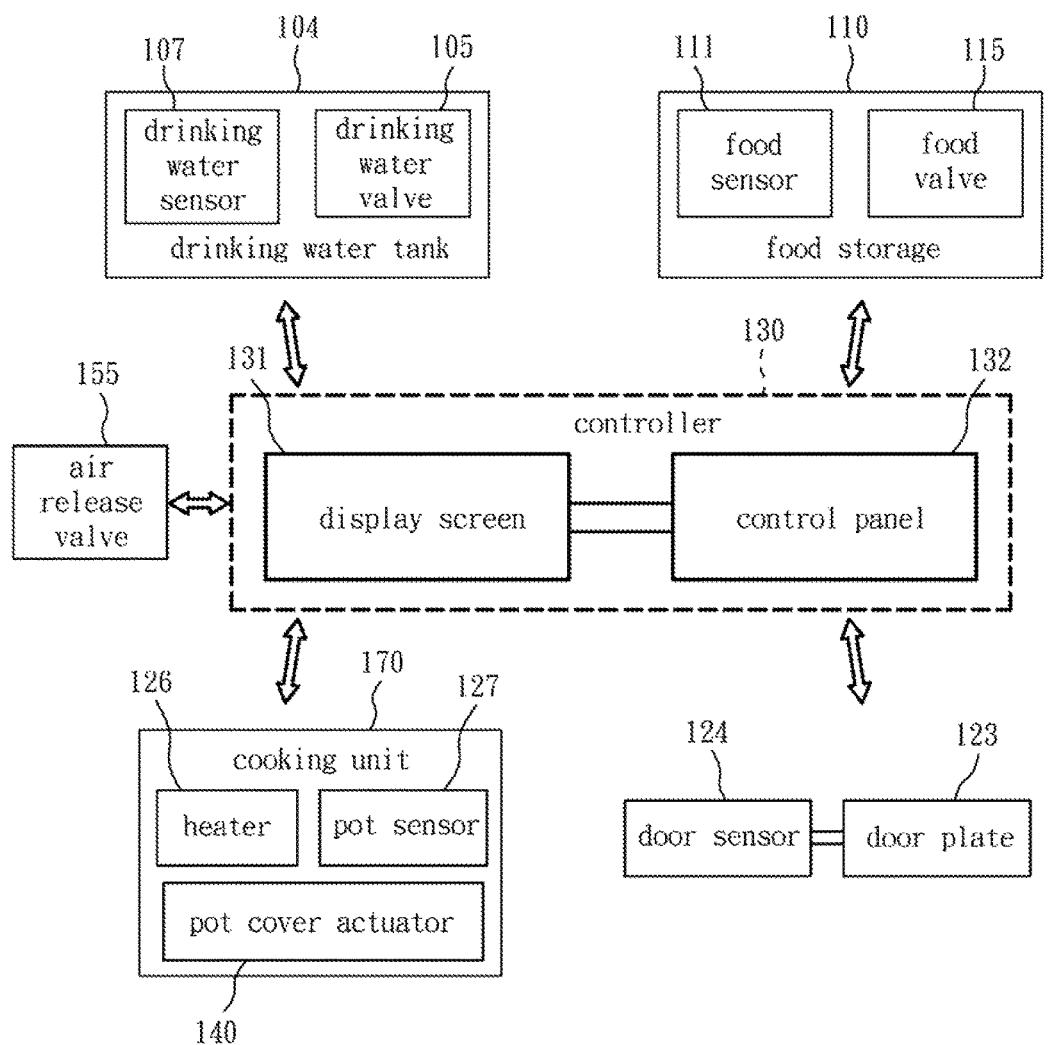
FIG. 2 is a schematic function block diagram of an automatic cooking apparatus capable of supplying drinking water shown in FIG. 1.

FIG. 1 is a schematic three-dimensional view of an appearance of an automatic cooking apparatus capable of supplying drinking water. FIG. 2 is a schematic function block diagram of an automatic cooking apparatus capable of supplying drinking water shown in FIG. 1. For illustrating the technical features of the present invention more specifically, four embodiments are provided. The first embodiment (as shown in FIG. 3, FIG. 4A, FIG. 4B and FIG. 4C) includes the least required components. The second embodiment (as shown in FIG. 5A and FIG. 5B) on top of the first embodiment further includes a confined space constructed by a partition and a pot for cooking, wherein an operation process of the second embodiment is the same as that of the first embodiment. The third embodiment (as shown in FIG. 6, FIG. 7A, FIG. 7B and FIG. 7C) and the fourth embodiment (as shown in FIG. 8, FIG. 9A, FIG. 9B, and FIG. 9C) use the confined space constructed by a pot cover and the pot for cooking, wherein a difference between the third embodiment and the fourth embodiment is a actuating pattern of a pot cover actuator, which impacts a process order of the third embodiment and the fourth embodiment.

As shown in FIG. 1 can be known form the appearance the present invention, the automatic cooking apparatus capable of supplying drinking water 100 includes a drinking water tank 104, a drinking water tank cover 101, a drinking water supply unit 102 and 103, a food storage 110, a food storage cover 112, a cooking unit 170, a controller 130, a door plate 123 and a door sensor 124. As the door plate 123 is opened state, there is an accommodation space in which a heater 126 and a pot 125 can be disposed.

As shown in FIG. 1, an upper left half part of the automatic cooking apparatus capable of supplying drinking water 100 can be designed for providing drinking water, and an right half part can be designed for cooking food, and an upper half part can be designed for storing water or food. However, such a design can be made flexibly according to different needs, such as adding a set of food storage, etc.

As shown in FIG. 2, it can be known that, in the automatic cooking apparatus capable of supplying drinking water 100, the controller 130 includes a display screen 131 and a control panel 132 on which a user can enter an instruction, wherein the control panel 132 is implemented by an electronic circuit. The controller 130 are electrically connected the several components for receiving or transmitting signals, wherein the components can be such as a drinking water sensor 107 and a drinking water valve 105 disposed in the drinking water tank 104; a food sensor 111 and a food valve 115 disposed in the food storage 110; an air release valve 155; the heater 126, the pot sensor 127, and the pot cover actuator 140 disposed in the cooking unit 170; the door sensor 124 and the door plate 123.

For example, after receives a food type or quantity sensed by the food sensor 111, the controller 130 may receive an instruction entered via the control panel 132 and then transmit a control signal to the food valve 115.

Figure 3:
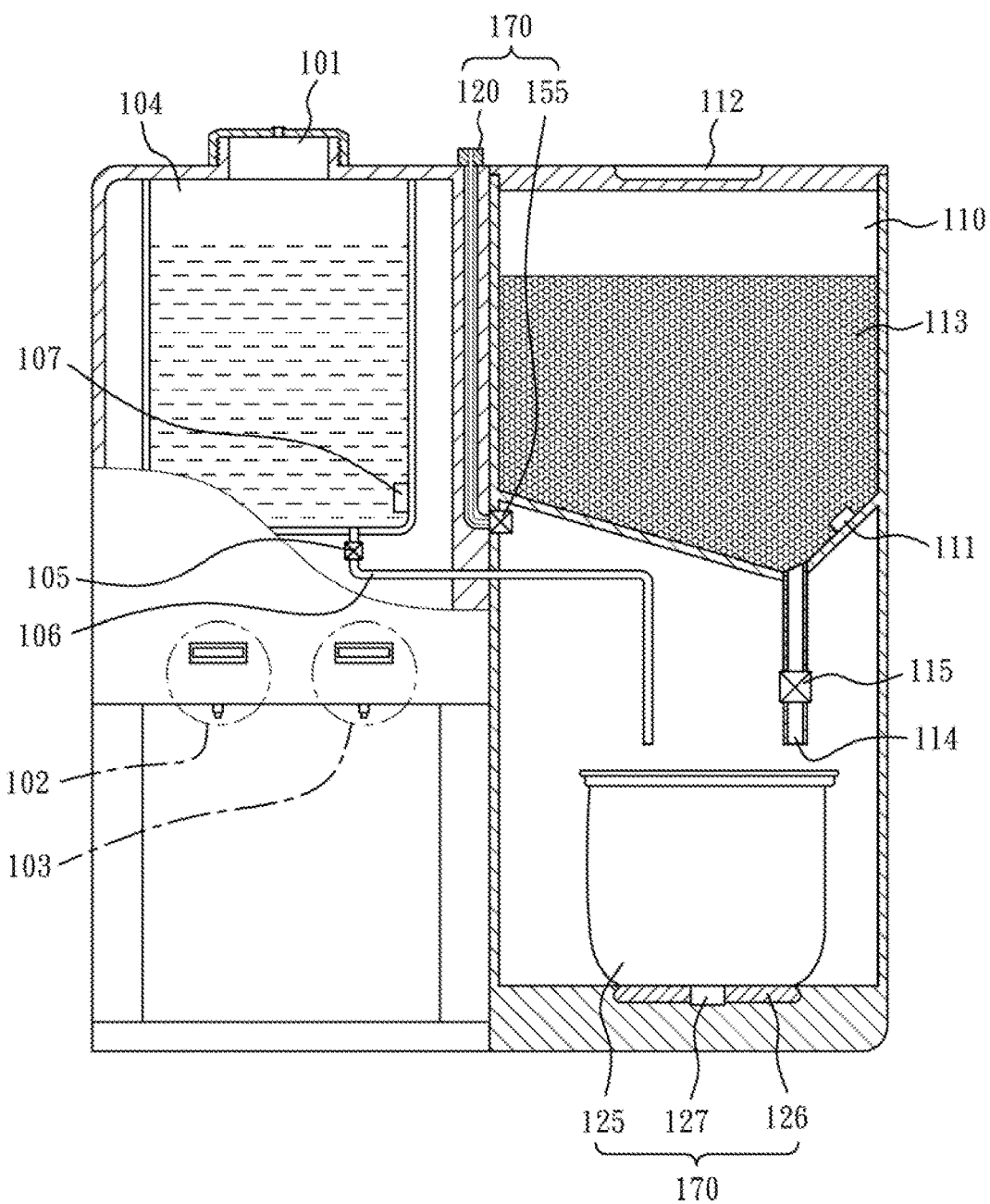
FIG. 3 is a schematic cross-sectional view of an automatic cooking apparatus capable of supplying drinking water according to the first embodiment of the present invention.
Figure 4A:
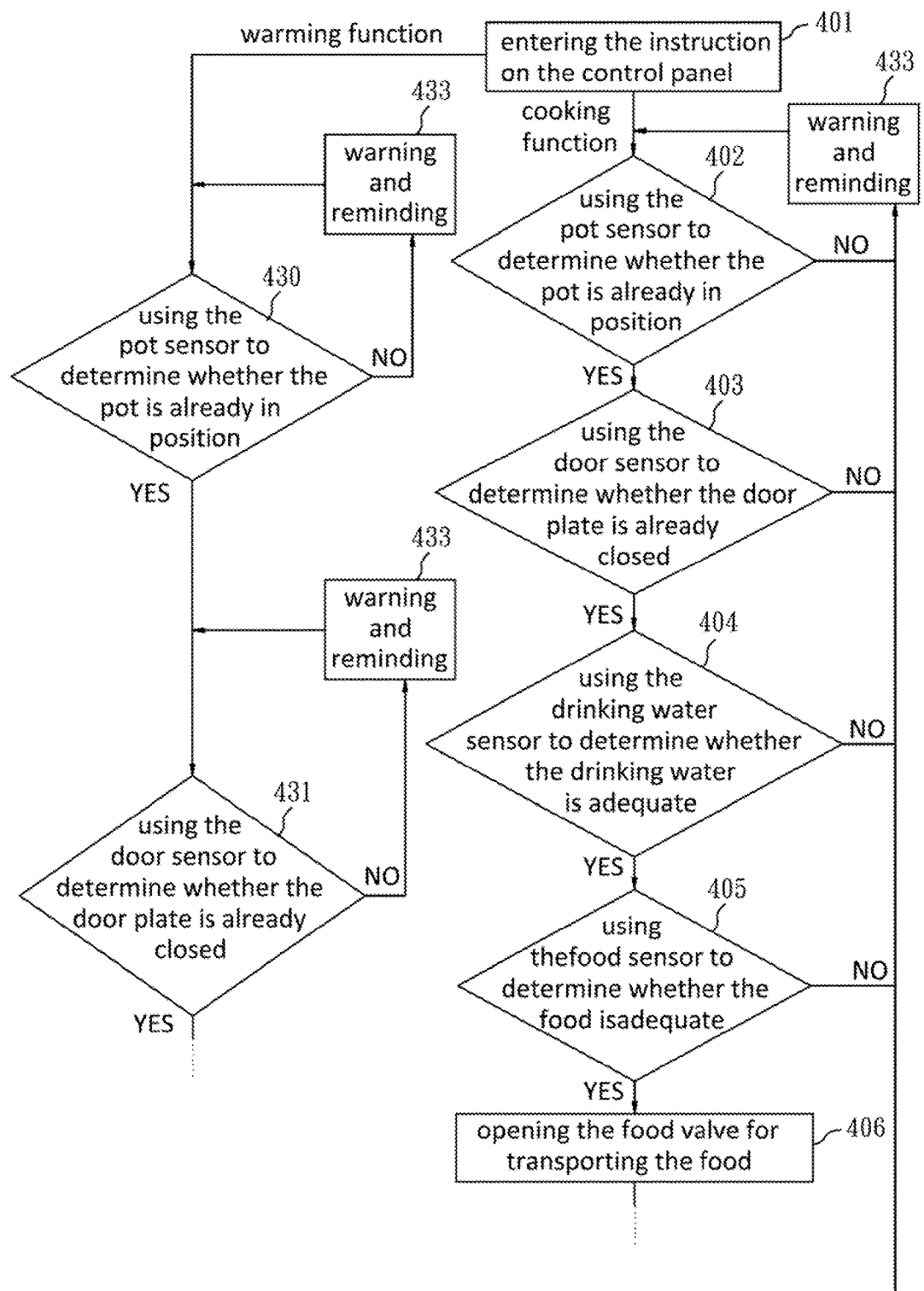
FIG. 4A, FIG. 4B and FIG. 4C illustrate a flow chart showing the operation of the automatic cooking apparatus capable of supplying drinking water according to the first embodiment of the present invention.
Figure 4B:
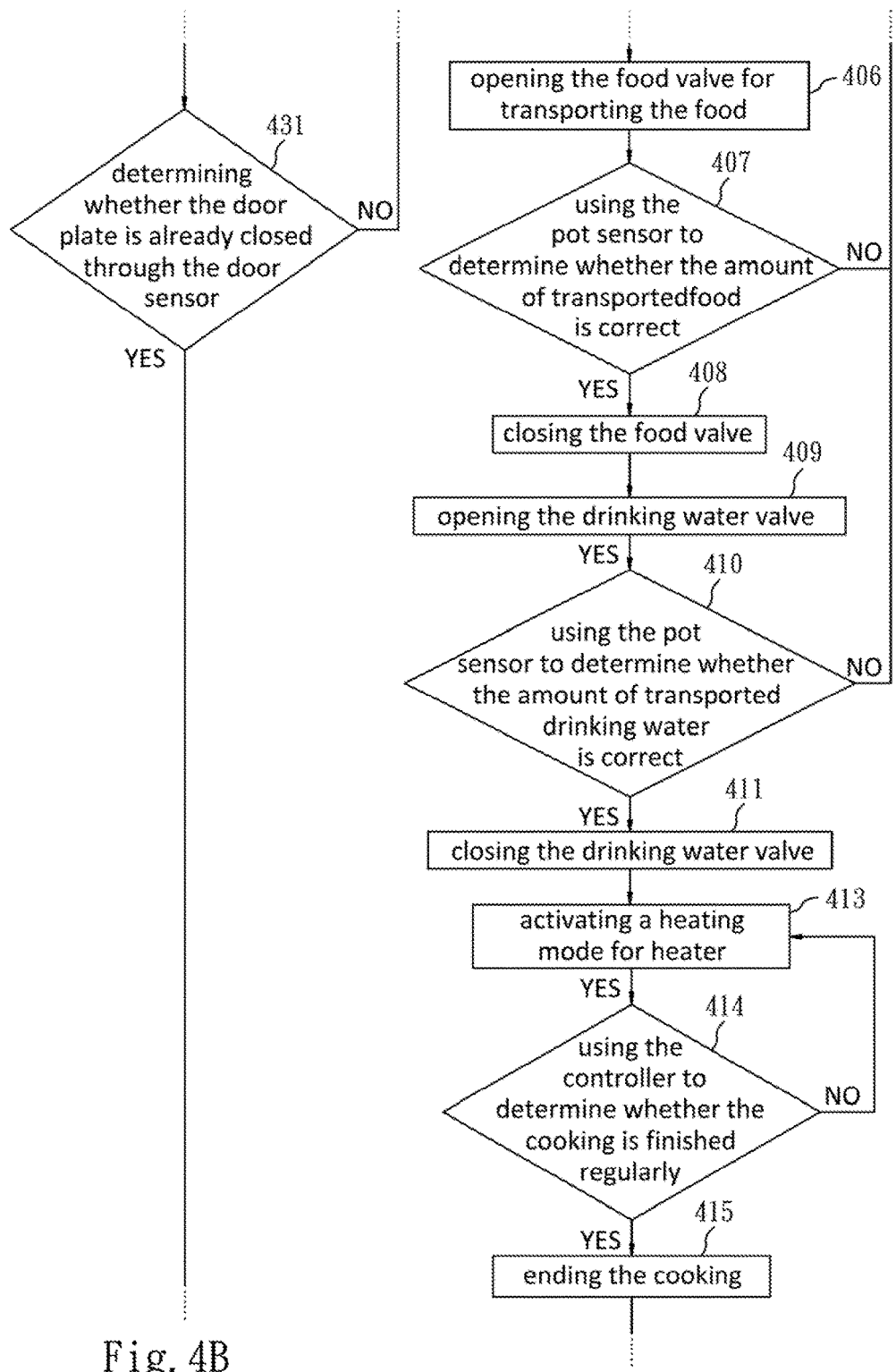
Figure 4C:
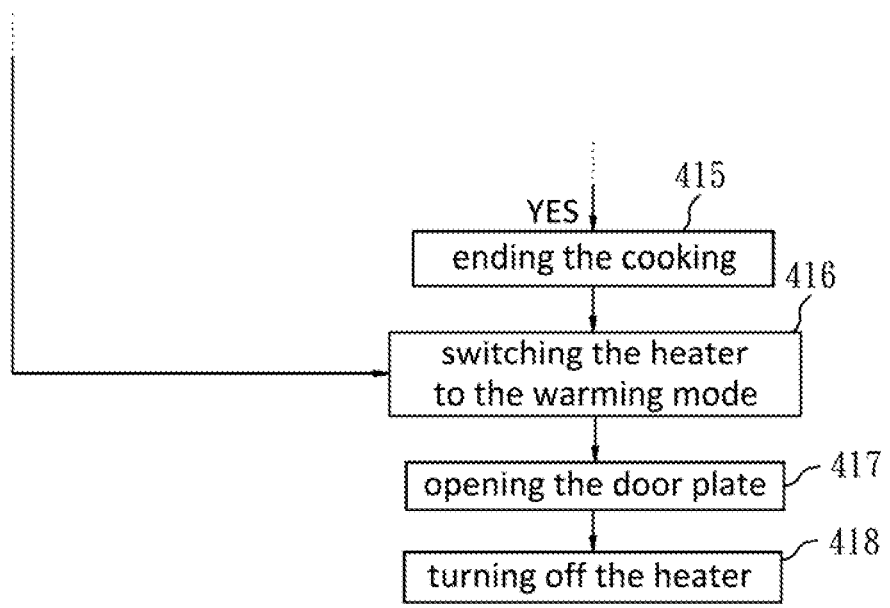
Figure 5A:
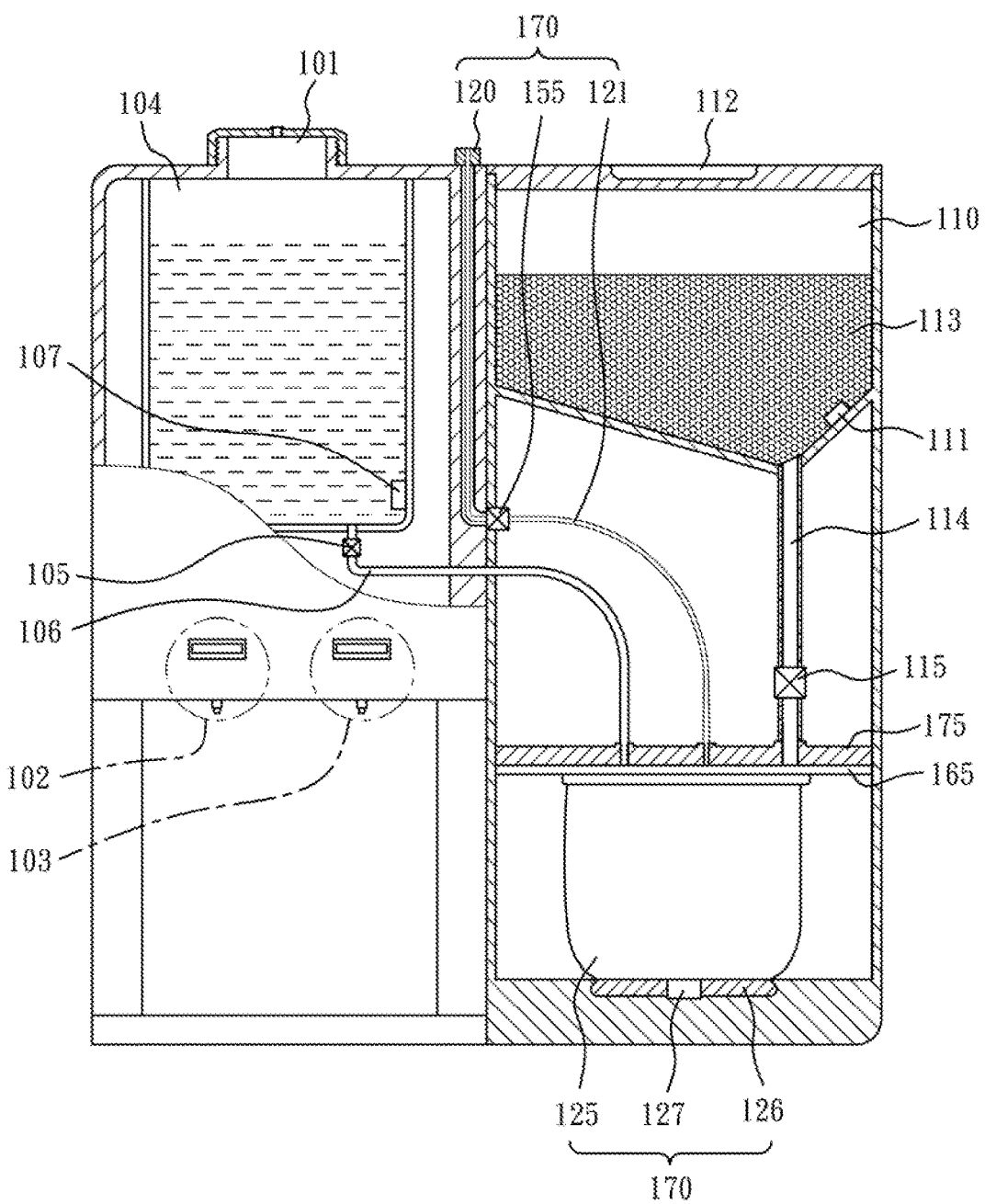
FIG. 5A is a schematic cross-sectional view of an automatic cooking apparatus capable of supplying drinking water according to the second embodiment of the present invention.
Figure 5B:
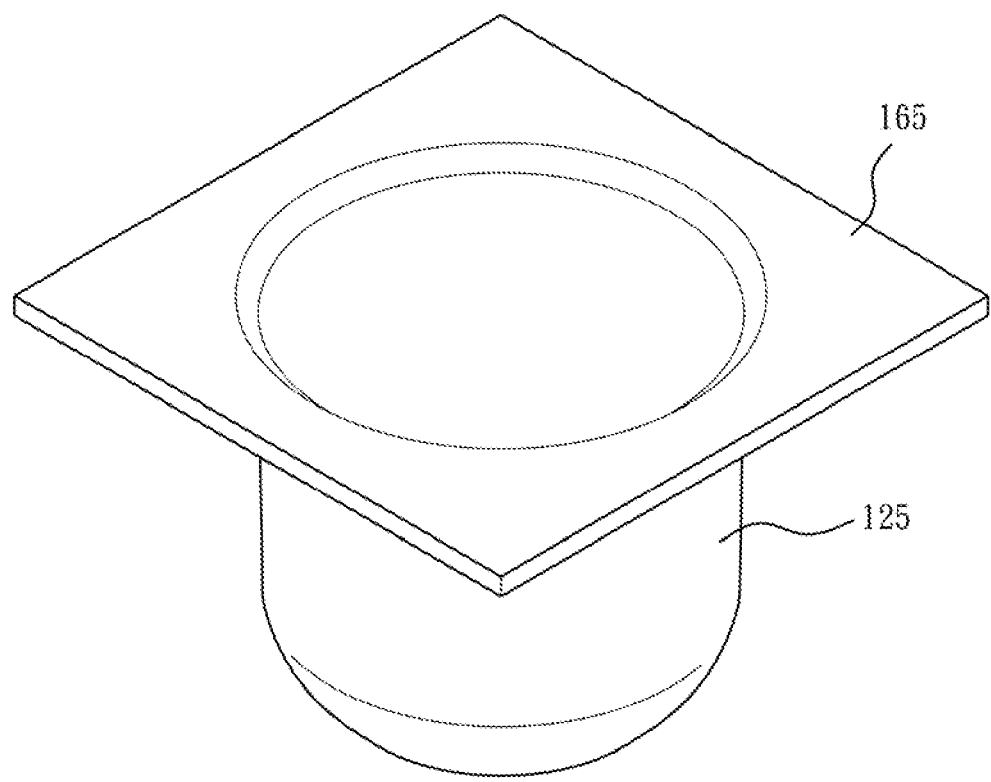
FIG. 5B is a schematic three-dimensional view of a pot according to the second embodiment of the present invention.

Continued from the above, the first embodiment of the present invention can be known by referring to FIG. 3, FIG. 4A, FIG. 4B and FIG. 4C. FIG. 3 is a schematic cross-sectional view of the automatic cooking apparatus capable of supplying drinking water according to the first embodiment of the present invention. FIG. 4A, FIG. 4B and FIG. 4C illustrate a flow chart showing the operation of the automatic cooking apparatus capable of supplying drinking water according to the first embodiment of the present invention.

In the first embodiment, the automatic cooking apparatus capable of supplying drinking water includes the drinking water tank 104, the drinking water tank cover 101, the drinking water sensor 107, a drinking water output tube 106 and the drinking water valve 105. The drinking water sensor 107 is disposed on a bottom-side surface of the drinking water tank 104, and the drinking water output tube 106 is disposed under the drinking water tank 104, and the drinking water valve 105 is disposed on the drinking water tube 106 to control the open or close of the drinking water tube 106, thereby appropriately adjusting the amount of drinking water. The drinking water supply unit includes at least one outlet such as a cold water outlet 102 and a hot water outlet 103, which is a well known technology and thus is not described again. The drinking water tank cover 101 is disposed over the drinking water tank 104.

In addition, the food storage 110 includes the food sensor 111, the food storage cover 112, a food output member 114 and the food valve 115. The food sensor 111 is disposed on a bottom surface of the food storage 110, and the food output member 114 is disposed under the food storage 110, and the food valve 115 is disposed on the food output member 114 to control the food output member 114. The shape of the food output member 114 can be a tubular shape or a grooved shape. The bottom surface of the food storage 110 can be a slant surface for allowing food to flow conveniently. The food storage cover 112 is disposed over the food storage 110.

The cooking unit 170 includes the heater 126, a steam output port 120, the air release valve 155 and the pot 125. The heater 126 is used for heating the pot 125 placed thereon, and an opening of the pot 125 is corresponding to the drinking water output tube 106 and the food output member 114 for receiving the drinking water and the food. A steam output member includes the air release valve 155 and the external steam output port 120, which is used for releasing water steam generated in the pot to the outside during cooking process. The air release valve 155 is controlled by the controller 130 to construct a confined space during cooking for conveniently braising food.

Further, please refer to FIG. 4A, FIG. 4B and FIG. 4C for understanding the operation process of the first embodiment.

Before cooking, preparation steps for the user is to place a washed empty pot 125 on the heater 126 after opening the door plate 123, and fill the drinking water tank 104 and the food storage 110 with water and food.

Then, the user enters an instruction on the control panel 132 (step 401) to select a cooking function or a warming function.

If the warming function is selected, step 430 is performed for using the pot sensor 127 to determine whether the pot 125 is already in position. When the result of step 430 is yes, step 431 is performed for using the door sensor 124 to determine whether the door plate 123 is already closed. When the result of step 431 is yes, step 416 is performed for switching the heater 126 to a warming mode, and then the door plate 123 is opened (step 417), and the heater 126 is turned off for safety reason (step 418).

If the cooking function is selected (step 401), step 402 is performed for using the pot sensor 127 to determine whether the pot 125 is already in position. When the result of step 402 is yes, step 403 is performed for using the door sensor 124 to determine whether the door plate 123 is already closed. When the result of step 403 is yes, step 404 is performed for using the drinking water sensor 107 to determine whether the drinking water is adequate. When the result of step 404 is yes, step 405 is performed for using the food sensor 111 to determine whether the food is adequate. When the result of step 405 is yes, the food valve 115 is opened for transporting the food (step 406), and then step 407 is performed for using the pot sensor 127 to determine whether the amount of transported food is correct. When the result of step 407 is yes, the food valve 115 is closed (step 408), and the drinking water valve 105 is opened for transporting the drinking water (step 409). Thereafter, step 410 is performed for using the pot sensor 127 to determine whether the amount of transported drinking water is correct. When the result of step 410 is yes, the drinking water valve 105 is closed (step 411), and a heating mode is activated for the heater 126 (step 413). Then, step 414 is performed for using the controller 130 to determine whether the cooking is finished regularly. When the result of step 414 is yes, the cooking is ended (step 415), and the heater 126 is switched to the warming mode (step 416), and the door plate 123 is opened (step 417), and the heater 126 is turned off for safety reason (step 418).

In the entire operation process, as long as abnormality occurs, warning and reminding will be issued to the user (step 433), and then the initial state is returned for restarting the aforementioned steps and processes, thus ensuring that every spare item has been well prepared before entering the heating mode or the warming mode, and also for safety reason. In addition, as shown in FIG. 4A, FIG. 4B and FIG. 4C, although the food and the drinking water are sensed after the door plate is closed, yet step 403 also can be performed later in accordance with the user's habits. Further, during cooking process, the open or close of the air release valve 155 also can be controlled for releasing the redundant water steam.

Please refer to FIG. 5A, FIG. 5B, FIG. 4A, FIG. 4B and FIG. 4C for understanding the second embodiment of the present invention. FIG. 5A is a schematic cross-sectional view of an automatic cooking apparatus capable of supplying drinking water according to the second embodiment of the present invention. FIG. 5B is a schematic three-dimensional view of a pot according to the second embodiment of the present invention. As the second embodiment has the same operation process with the first embodiment, the operation process of second embodiment can be comprehended by referring to FIG. 4A, FIG. 4B and FIG. 4C. In the second embodiment, the automatic cooking apparatus capable of supplying drinking water includes the drinking water tank 104, the drinking water tank cover 101, the drinking water sensor 107, the drinking water output tube 106 and the drinking water valve 105. The drinking water sensor 107 is disposed on a bottom-side surface of the drinking water tank 104, and the drinking water output tube 106 is disposed under the drinking water tank 104, and the drinking water valve 105 is disposed on the drinking water tube 106 to control the open or close of the drinking water tube 106, thereby appropriately adjusting the amount of drinking water. The drinking water supply unit includes a cold water outlet 102 and a hot water outlet 103. The drinking water tank cover 101 is disposed over the drinking water tank 104.

In addition, the food storage 110 includes the food sensor 111, the food storage cover 112, the food output member 114 and the food valve 115. The food sensor 111 is disposed on a bottom surface of the food storage, and the food output member 114 is disposed under the food storage 110, and the food valve 115 is disposed on the food output member 114 to control the food output member 114. The shape of the food output member 114 can be a tubular shape or a grooved shape. The bottom surface of the food storage 110 can be a slant surface for allowing food to flow conveniently. The food storage cover 112 is disposed over the food storage 110.

The cooking unit 170 includes the heater 126, the steam output port 120, a steam output tube 121, the air release valve 155 and the pot 125. As shown in FIG. 5B, the pot 125 has a square flange 165 of which the size can be engaged with wall surfaces, and thus the pot 125 can be fixed in a position by the engagement of the flange 165 and the wall surfaces while the pot 125 is being placed. The openings of the food output member 114, the steam output tube 121 and the drinking water output tube 106 are aligned with the opening of the pot 125 through the partition 175. The heater 126 is used for heating the pot 125 placed thereon. The steam output member includes the air release valve 155, the external steam output port 120 and the steam output tube 121, which is used for releasing water steam generated in the pot to the outside during cooking process. The air release valve 155 is controlled by the controller 130, to construct a confined space during cooking for conveniently braising food. Accordingly, the partition can form a confined space with a flange of the pot to achieve a similar braising result of the pot cover.

Referring to FIG. 4A, FIG. 4B and FIG. 4C, in the entire operation process, as long as abnormality occurs, warning and reminding will be issued to the user (step 433), and then the initial state is returned for restarting the aforementioned steps and processes, thus ensuring that every spare item has been well prepared before entering the heating mode or the warming mode, and also for safety reason. In addition, as shown in FIG. 4A, FIG. 4B and FIG. 4C, although the food and the drinking water are sensed after the door plate is closed, yet step 403 also can be performed later in accordance with the user's habits. Further, during cooking process, the open or close of the air release valve 155 also can be controlled for releasing the redundant water steam.

Figure 6:
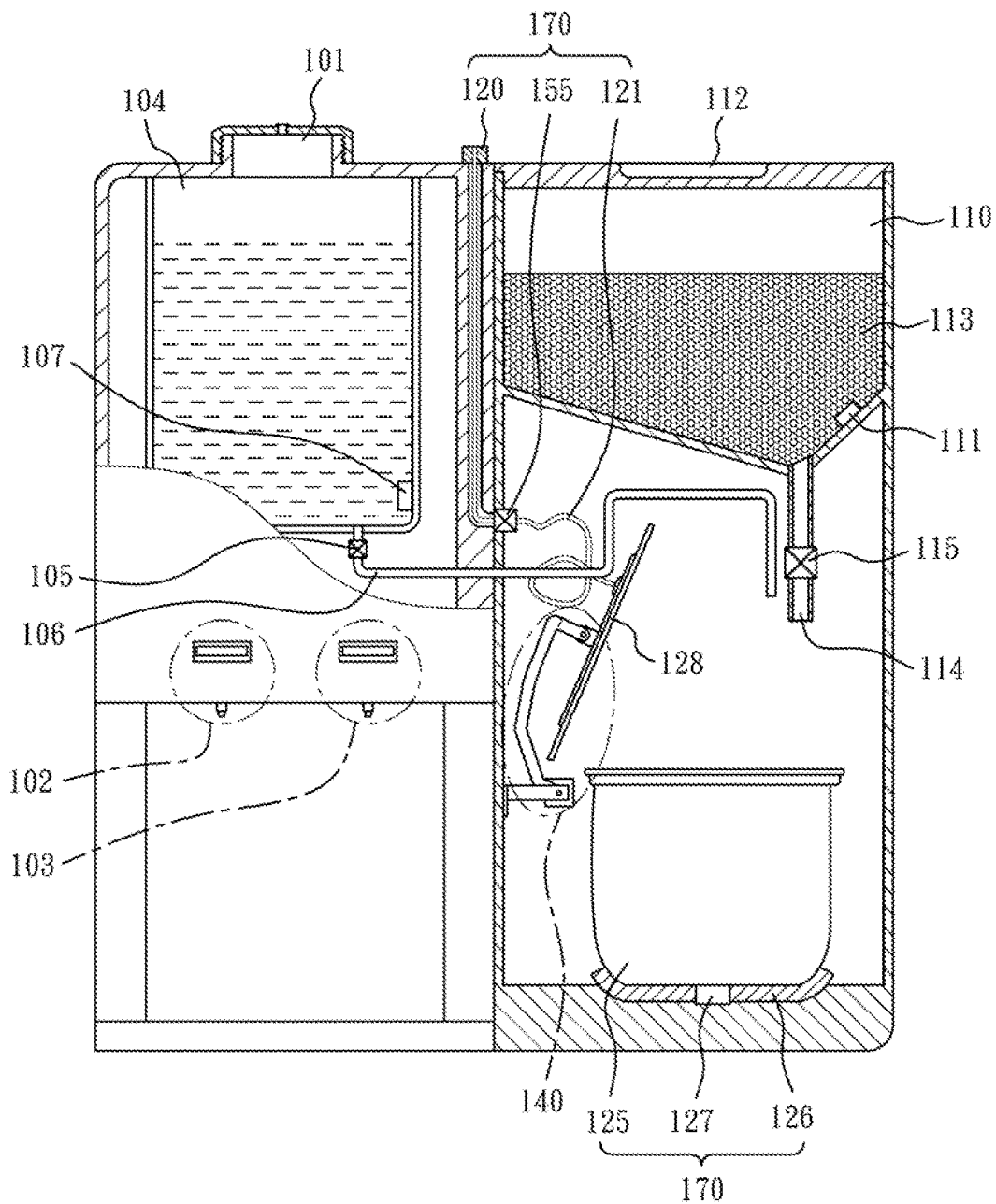
FIG. 6 is a schematic cross-sectional view of an automatic cooking apparatus capable of supplying drinking water according to the third embodiment of the present invention.
Figure 7A:
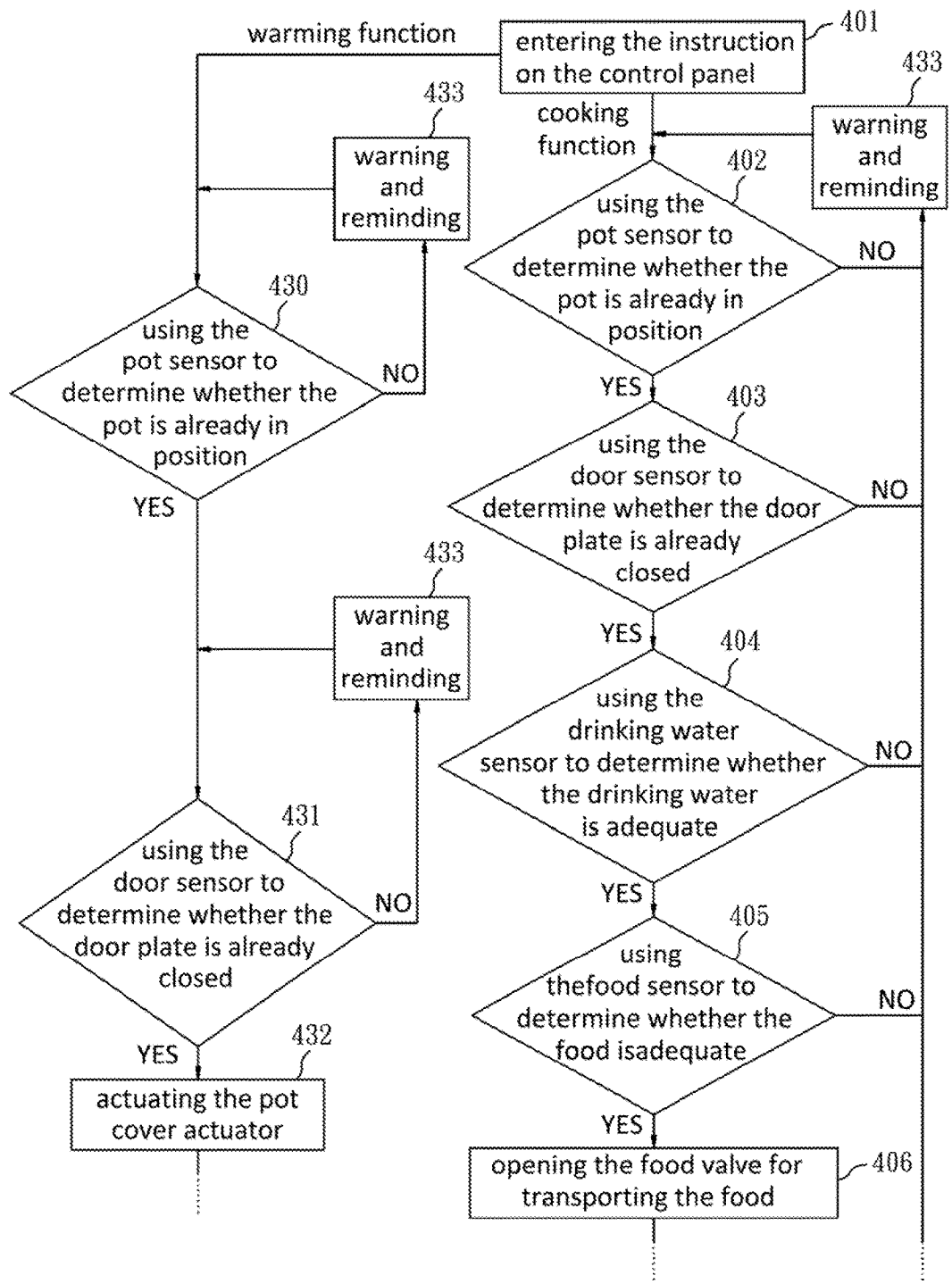
FIG. 7A, FIG. 7B and FIG. 7C illustrate a flow chart showing the operation of the automatic cooking apparatus capable of supplying drinking water according to the third embodiment of the present invention.
Figure 7B:
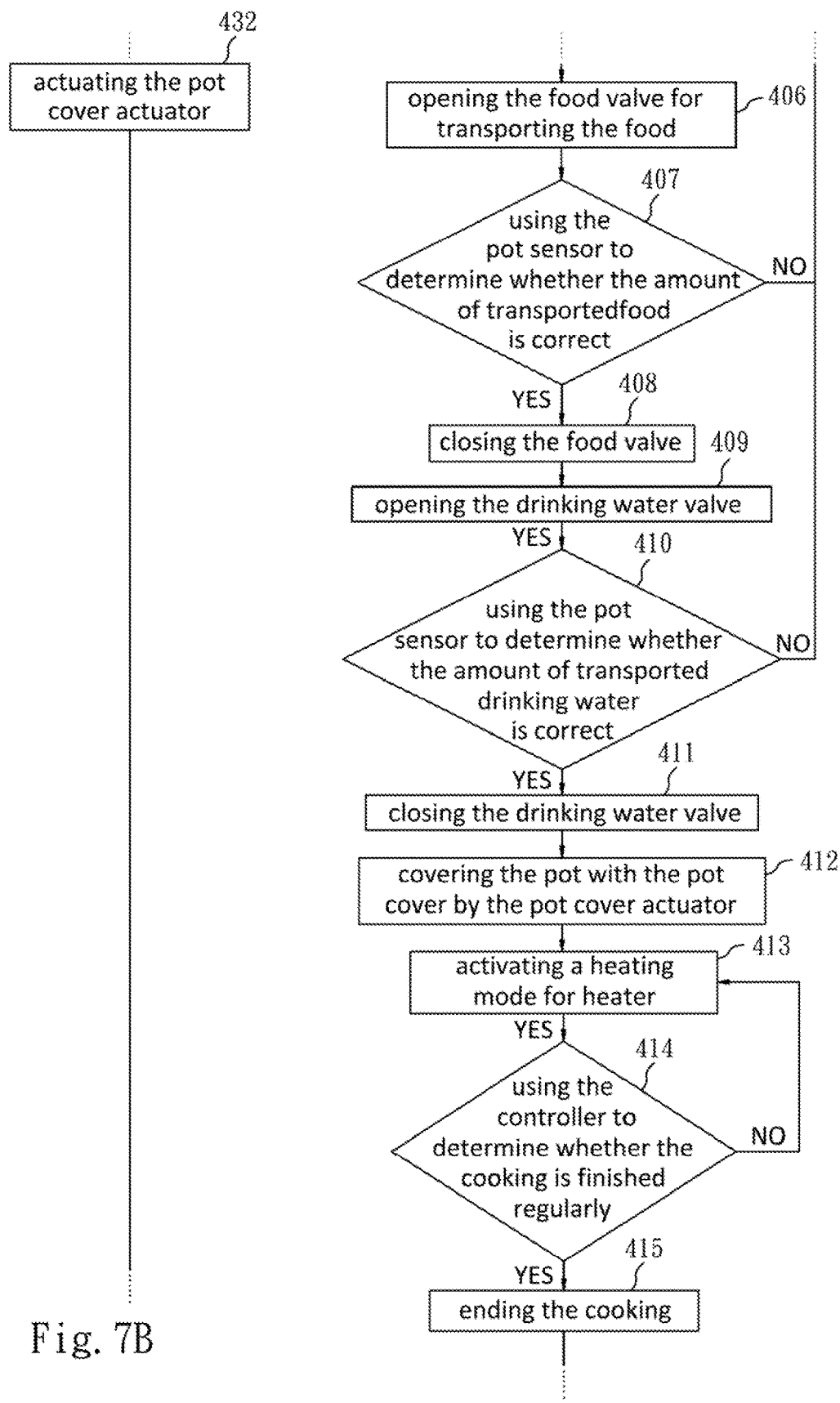
Figure 7C:
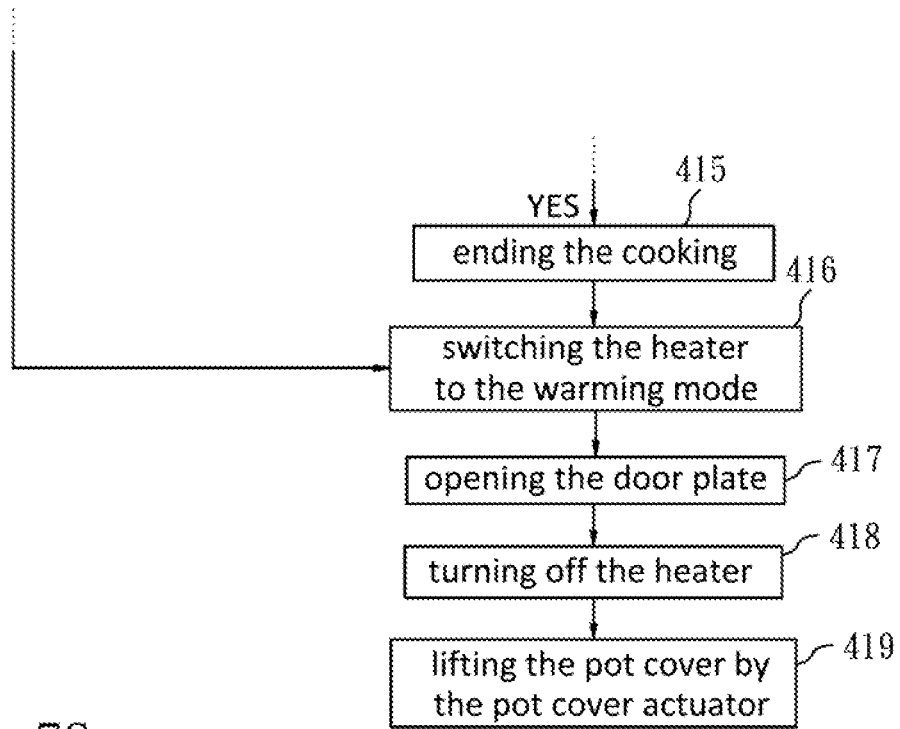

The third embodiment of the present invention can be comprehended by referring to FIG. 6, FIG. 7A, FIG. 7B and FIG. 7C. FIG. 6 is a schematic cross-sectional view of an automatic cooking apparatus capable of supplying drinking water according to the third embodiment of the present invention. FIG. 7A, FIG. 7B and FIG. 7C illustrate a flow chart showing the operation of the automatic cooking apparatus capable of supplying drinking water according to the third embodiment of the present invention.

In the third embodiment, the automatic cooking apparatus capable of supplying drinking water includes the drinking water tank 104, the drinking water tank cover 101, the drinking water supply unit 102 and 103, the food storage 110, the food storage cover 112, the cooking unit 170 and the controller 130.

The drinking water tank 104 includes the drinking water sensor 107, the drinking water output tube 106 and the drinking water valve 105, wherein the drinking water sensor 107 is disposed on a bottom-side surface of the drinking water tank 104, and the drinking water output tube 106 is disposed under the drinking water tank 104, and the drinking water valve 105 is disposed on the drinking water tube 106 to control the open or close of the drinking water tube 106 thereby appropriately adjusting the amount of drinking water. The drinking water supply unit includes at least one outlet, such as a cold water outlet 102 and a hot water outlet 103. The drinking water tank cover 101 is disposed over the drinking water tank 104.

The food storage 110 includes the food sensor 111, a food output member 114 and the food valve 115. The food sensor 111 is disposed on a bottom surface of the food storage, and the food output member 114 is disposed under the food storage 110, and the food valve 115 is disposed on the food output member 114 to control the food output member 114. The shape of the food output member 114 can be a tubular shape or a grooved shape. The bottom surface of the food storage 110 can be a slant surface for allowing food to flow conveniently. The food storage cover 112 is disposed over the food storage 110.

The cooking unit 170 includes the heater 126, the steam output port 120, the steam output tube 121, the air release valve 155 and the pot 125. The heater 126 is used for heating the pot 125 placed thereon, and an opening of the pot 125 is corresponding to the drinking water output tube 106 and the food output member 114 for receiving the drinking water and the food. A steam output member includes the steam output tube 121 and the external steam output port 120, which is used for releasing water steam generated in the pot to the outside during cooking process. The steam output port 120 can make a confined space with a latch in the pot 125 in accordance with needs for braising food, or control the flow of the steam output tube 121 by directly using the air release valve 155. The pot cover actuator 140 is used for actuating the pot cover 128 to cover and close the pot 125, wherein the pot cover 128 corresponding to an opening of the pot 125 has a first hole connected with the steam output tube 121.

The controller 130 is electrically connected to the drinking water sensor 107, the food sensor 111, the drinking valve 105, the food valve 115, the pot cover actuator 140 and the heater 126, wherein the controller 130 receives a sense result from the drinking water sensor 107 and the food sensor 111, and transmits a control signal to the drinking water valve 105, the food valve 115, the pot cover actuator 140 and the heater 126 in accordance with the instruction of the user.

In the third embodiment of the automatic cooking apparatus capable of supplying drinking water, the pot cover actuator 140 is a single-arm transmission mechanism, and a movement of the pot cover 128 is an arc swing path.

In the third embodiment, the automatic cooking apparatus capable of supplying drinking water further includes the pot sensor 127 disposed on the heater 126 and under the pot 125 to sense a weight of the pot (empty pot state, with drinking water state and/or with food state), and is electrically connected to the controller 130 so as to return the weight of the pot to the controller 130. As shown in FIG. 3, the shape of heater 126 is a ring, and the pot sensor 127 can be disposed on the center of the heater.

In the third embodiment, the automatic cooking apparatus capable of supplying drinking water further includes the door plate 123 and the door sensor 124. The door sensor 124 senses a door plate 123 state (the open or close) and is electrically connected to the controller 130 so as to return the door plate state to the controller 130. The heater 126 includes the heating mode and the warming mode. The drinking water output tube 106 can be connected to the hot water outlet 103 to conduct hot water into the pot 125 of the cooking unit, thereby speeding the cooking time.

More specifically, the operation process of third embodiment can be comprehended by referring to FIG. 7A, FIG. 7B and FIG. 7C.

Before cooking, preparation steps for the user is to place a washed empty pot 125 on the heater 126 after opening the door plate 123, and fill the drinking water tank 104 and the food storage 110 with water and food.

Then, the user enters an instruction on the control panel 132 (step 401) to select a cooking function or a warming function.

If the warming function is selected, step 430 is performed for using the pot sensor 127 to determine whether the pot 125 is already in position. When the result of step 430 is yes, step 431 is performed for using the door sensor 124 to determine whether the door plate 123 is already closed. When the result of step 431 is yes, step 432 is performed for actuating the pot cover actuator, and the heater 126 is switched to the warming mode (step 416), and then the door plate 123 is opened (step 417), and the heater 126 is turned off for safety reason (step 418), and the pot cover 128 is lifted by the pot cover actuator (step 419).

If the cooking function is selected (step 401), step 402 is performed for using the pot sensor 127 to determine whether the pot 125 is already in position. When the result of step 402 is yes, step 403 is performed for using the door sensor 124 to determine whether the door plate 123 is already closed. When the result of step 403 is yes, step 404 is performed for using the drinking water sensor 107 to determine whether the drinking water is adequate. When the result of step 404 is yes, step 405 is performed for using the food sensor 111 to determine whether the food is adequate. When the result of step 405 is yes, the food valve 115 is opened for transporting the food (step 406), and then step 407 is performed for using the pot sensor 127 to determine whether the amount of transported food is correct. When the result of step 407 is yes, the food valve 115 is closed (step 408), and the drinking water valve 105 is opened for transporting the drinking water (step 409). Thereafter, step 410 is performed for using the pot sensor 127 to determine whether the amount of transported drinking water is correct. When the result of step 410 is yes, the drinking water valve 105 is closed (step 411), and the pot cover 128 is covered pot 125 by the pot cover actuator (step 412), and a heating mode is activated for the heater 126 (step 413). Then, step 414 is performed for using the controller 130 to determine whether the cooking is finished regularly. When the result of step 414 is yes, the cooking is ended (step 415), and the heater 126 is switched to the warming mode (step 416), and the door plate 123 is opened (step 417), and the heater 126 is turned off for safety reason (step 418), and the pot cover 128 is lifted by the pot cover actuator (step 419).

In the entire operation process, as long as abnormality occurs, warning and reminding will be issued to the user (step 433), and then the initial state is returned for restarting the aforementioned steps and processes, thus ensuring that every spare item has been well prepared before entering the heating mode or the warming mode, and also for safety reason. In addition, as shown in FIG. 7A, FIG. 7B and FIG. 7C, although the food and the drinking water are sensed after the door plate is closed, yet step 403 also can be performed later in accordance with the user's habits.

Figure 8:
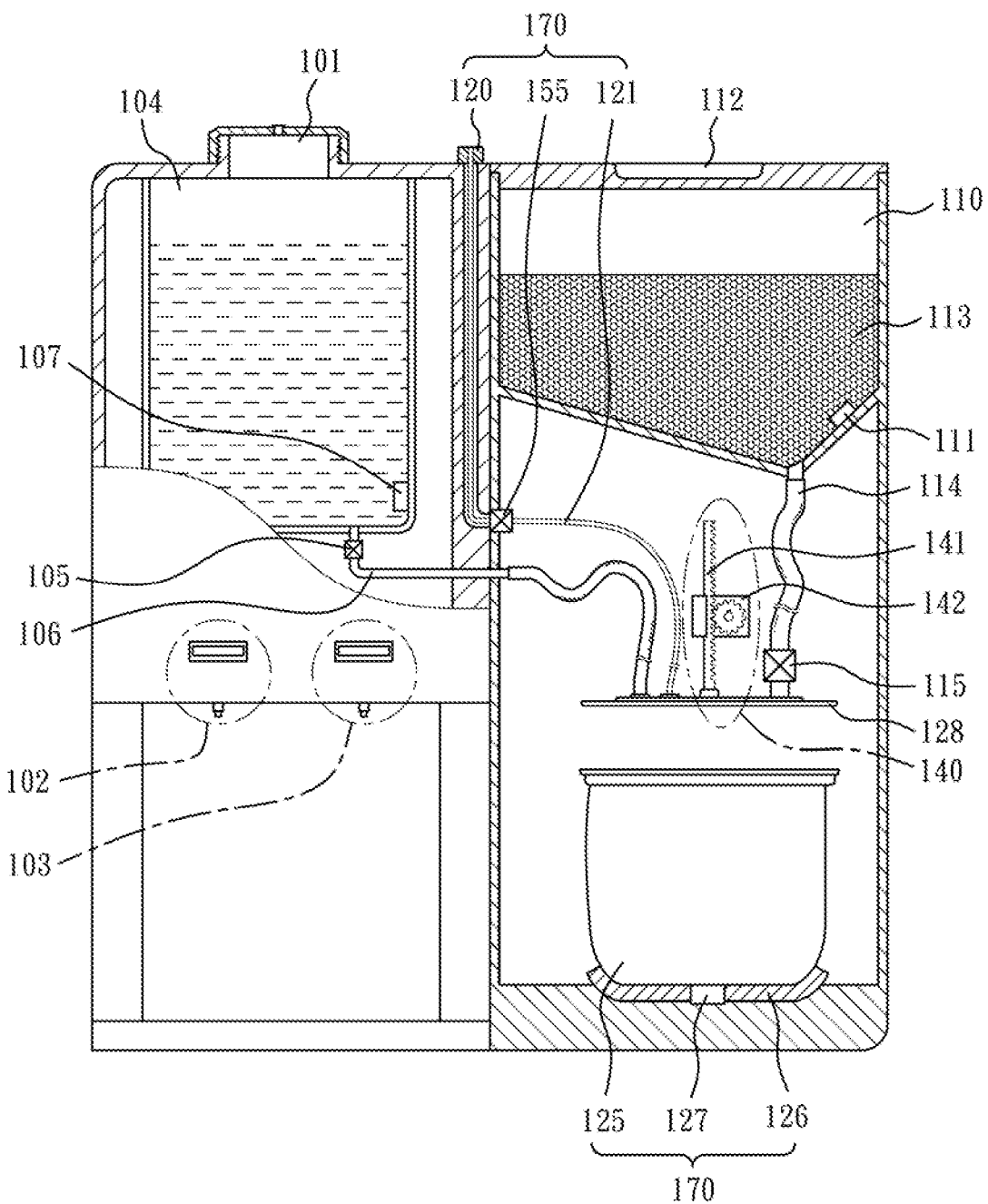
FIG. 8 is a schematic cross-sectional view of an automatic cooking apparatus capable of supplying drinking water according to the fourth embodiment of the present invention.
Figure 9A:
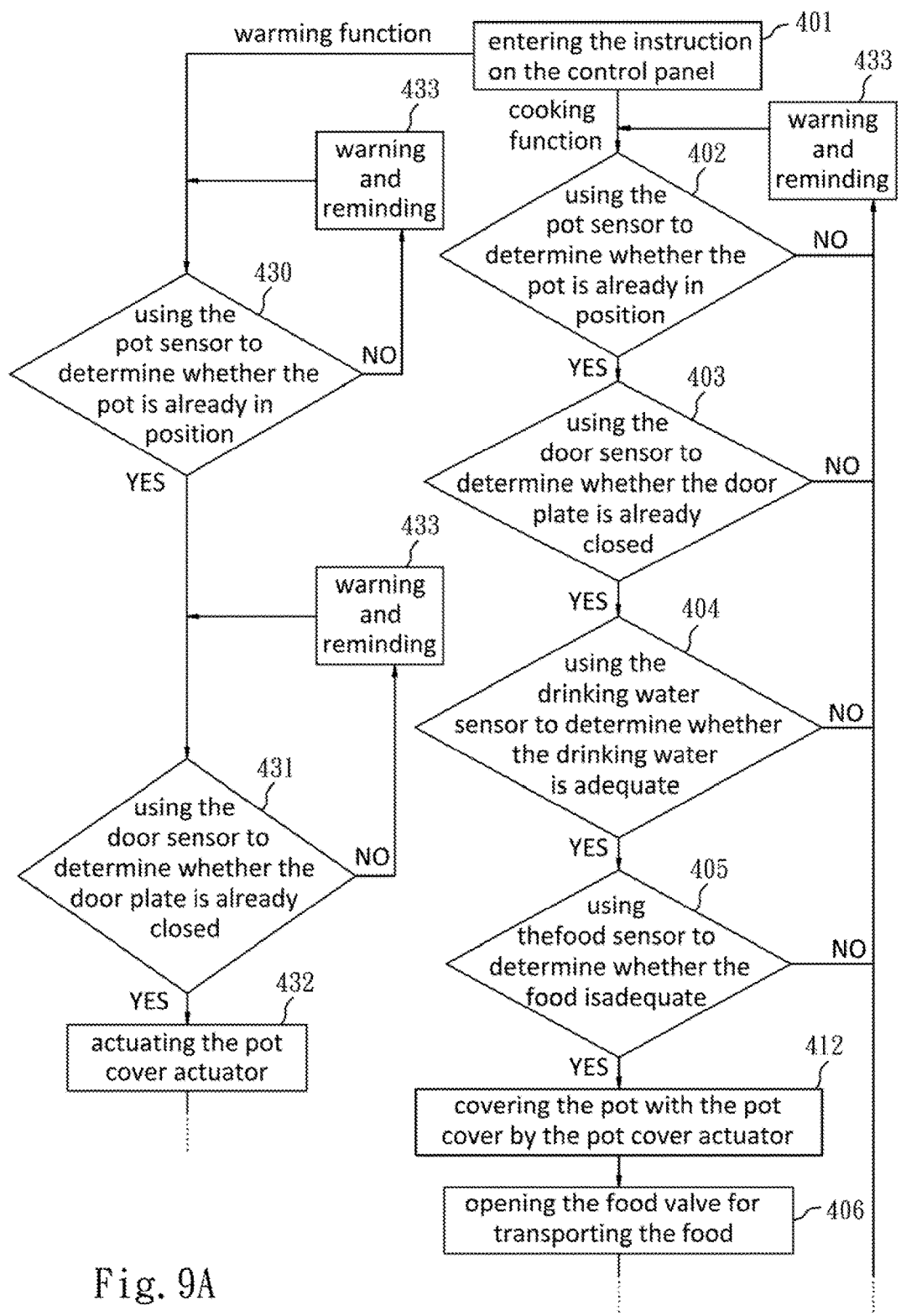
FIG. 9A, FIG. 9B and FIG. 9C illustrate a flow chart showing the operation of the automatic cooking apparatus capable of supplying drinking water according to the fourth embodiment of the present invention.
Figure 9B:
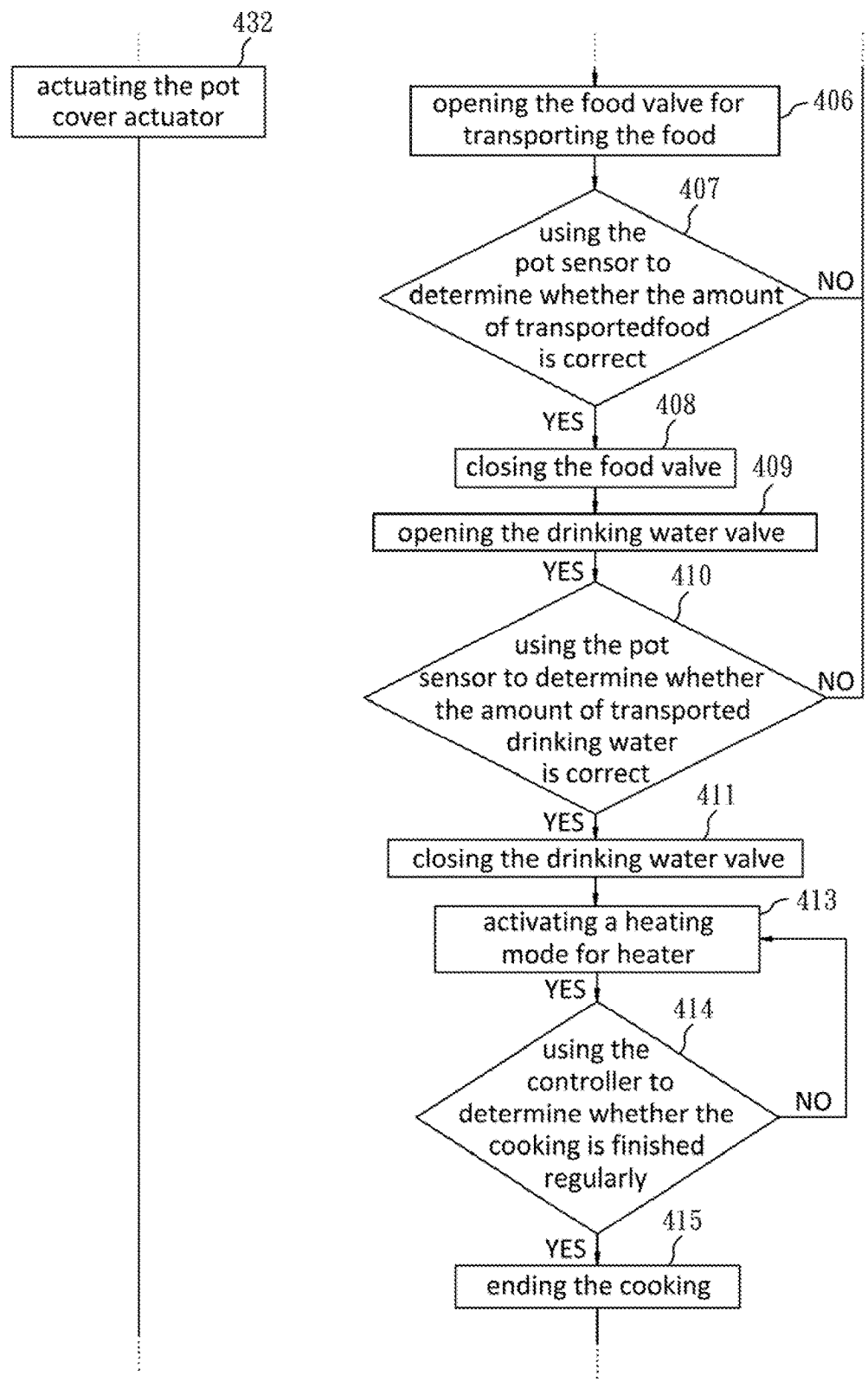
Figure 9C:
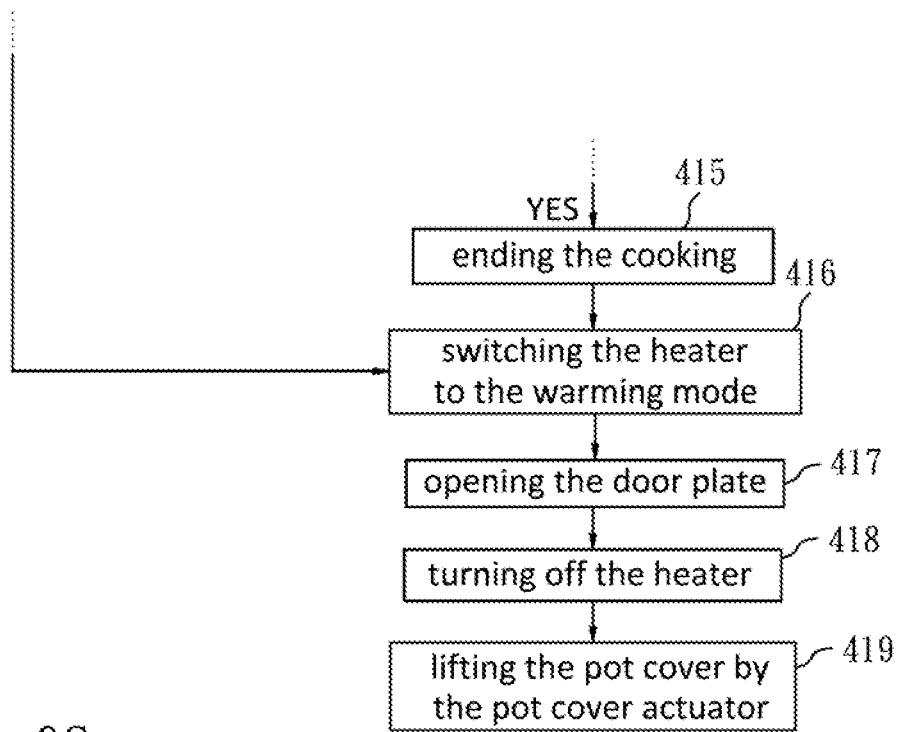

The fourth embodiment of the present invention can be comprehended by referring to FIG. 8, FIG. 9A, FIG. 9B and FIG. 9C. FIG. 8 is a schematic cross-sectional view of an automatic cooking apparatus capable of supplying drinking water according to the fourth embodiment of the present invention. FIG. 9A, FIG. 9B and FIG. 9C illustrate a flow chart showing the operation of the automatic cooking apparatus capable of supplying drinking water according to the fourth embodiment of the present invention. Continued from the above, the difference between the third embodiment and the fourth embodiment is the change of the pot cover actuator.

In the fourth embodiment, the pot cover actuator 140 belongs to a power transmission mechanism such as a gear wheel including a track 141 and a gear motor 142, and thus the movement of the pot cover 128 is a vertical path, which is moving up and down. As shown in FIG. 8, the pot cover 128 further includes a first hole, a second hole and a third hole, wherein the first hole connected with the steam output tube 121, the second hole connected with the drinking water output tube 106, and the third hole connected with the food output member 114. As the pot cover actuator 140 actuates the pot cover 128 moving up and down, a flexible tube or an appropriate length tube can be used in the steam output tube 121, the drinking water output tube 106 and the food output member 114. Of course, as described above, the steam output port 120 can make a confined space with a latch in the pot 125 in accordance with needs for braising food. Based on the above, the operation processes of the fourth embodiment and the third embodiment are not quite the same, please refer to FIG. 9A, FIG. 9B, and FIG. 9C for understanding the operation processes.

Before cooking, the preparation steps are the same, and the warming function is the same, and step 401 to step 405 of the cooking function are also the same. Thus, please directly see step 405 of FIG. 9A. Step 405 is performed for using the food sensor 111 to determine whether the food is adequate. When the result of step 405 is yes, the pot cover 128 is covered pot 125 by the pot cover actuator (step 412), and the food valve 115 is opened for transporting the food (step 406), and then step 407 is performed for using the pot sensor 127 to determine whether the amount of transported food is correct. When the result of step 407 is yes, the food valve 115 is closed (step 408), and the drinking water valve 105 is opened for transporting the drinking water (step 409). Thereafter, step 410 is performed for using the pot sensor 127 to determine whether the amount of transported drinking water is correct. When the result of step 410 is yes, the drinking water valve 105 is closed (step 411), and a heating mode is activated for the heater 126 (step 413). Then, step 414 is performed for using the controller 130 to determine whether the cooking is finished regularly. When the result of step 414 is yes, the cooking is ended (step 415), and the heater 126 is switched to the warming mode (step 416), and the door plate 123 is opened (step 417), and the heater 126 is turned off for safety reason (step 418), and the pot cover 128 is lifted by the pot cover actuator (step 419).

In the entire operation process, as long as abnormality occurs, warning and reminding will be issued to the user (step 433), and then the initial state is returned for restarting the aforementioned steps and processes, thus ensuring that every spare item has been well prepared before entering the heating mode or the warming mode, and also for safety reason. In addition, as shown in FIG. 9A, FIG. 9B and FIG. 9C, although the food and the drinking water are sensed after the door plate is closed, yet step 403 also can be performed later in accordance with the user's habits.

Therefore, in the first embodiment the pot cover is not needed; in the second embodiment, the confined space is constructed by the pot and the partition; in the third embodiment, the confined space is constructed by covering the pot with the pot cover, wherein the drinking water and the food have to be put first and then covers the pot with the pot cover; in the fourth embodiment, the confined space is also constructed by covering pot with the pot cover, wherein the pot has to be covered with the pot cover first and then puts the drinking water and the food.

As can be known form the aforementioned embodiments of the automatic cooking apparatus capable of supplying drinking water of the present invention, the processes of food cooking, drinking water supplying, heating, warming etc. are assembled in an electrical apparatus controlled by a automation supplying drinking water directly, which can improve the trivial process of using conventional electrical rice-cooker or electrical cooker in which a measuring cup is still needed for measuring the amounts of food and water by manpower. Therefore, the present invention can directly introduce in required water by using a simple controller (even only using a button) to intelligently control the ratio of food and water during cooking, thereby achieving a convenient, time-saving and delicious cooking.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An automatic cooking apparatus capable of simultaneously supplying drinking water for drinking and cooking food, comprising: a housing a drinking water supply unit for supplying drinking water and a cooking device for cooking food, the drinking water supply unit and the cooking device being arranged adjacently, wherein the cooking device is selectively operated for cooking and the drinking water supply unit is selectively operated for dispensing drinking water, the drinking water supply unit is capable of dispensing water while simultaneously the cooking unit is operated for cooking, the drinking water supply unit comprising:

a drinking water tank supported in the drinking water supply unit for storing a predetermined amount of water, said drinking water tank being a self-contained structure not connected to external water supplying pipe;

a drinking water sensor disposed in the drinking water tank;

a drinking water output tube having a first end and a second end, the first end connecting to the drinking water tank;

a drinking water valve provided within the drinking water output tube; and a drinking water supplying apparatus connected to the drinking water tank, the drinking water supplying apparatus comprising at least one drinking water outlet solely for dispensing the drinking water stored in the drinking water tank out of the automatic cooking apparatus;

the cooking device comprising:

a food storage having a cavity for storing a predetermined amount of food and defining an accommodation space below said food storage for cooking food;

a food sensor disposed in the food storage;

a food output member disposed under the food storage;

a food valve provided within the food output member; and a cooking unit, which comprises:

a pot provided directly underneath the food output member inside said accommodation space for receiving the food directly from the food output member, the second end of the drinking water output tube being extended directly above the pot inside said accommodation space in such a manner that water from the drinking water tank is directly delivered to the pot via the drinking water output tube;

a pot sensor disposed under the pot to sense a weight of the pot;

wherein the housing comprises a confined space defined by external walls surrounding the cooking unit, a wall between the drinking water supply unit and the cooking unit, a door plate and a partition above the pot to accommodate the pot within the confined space, and the partition acts as a cover for the pot to substantially seal a space within the pot;

a heater provided under the pot within said accommodation space; and a controller electrically connected to the drinking water sensor, the food sensor, the pot sensor for inspecting whether the pot is in position, the drinking water valve, the food valve and the heater, the controller is configured to operate the automatic cooking apparatus on at least one of a water supplying mode and a cooking mode, wherein said drinking water tank supplies the drinking water to said drinking water supply unit to dispense through the drinking water outlet while said drinking water tank supplies the drinking water to said pot via the drinking water output tube, wherein in the water supplying mode, the drinking water supply unit dispenses water from the drinking water tank through the drinking water outlet of the drinking water supplying apparatus without passing through the drinking water output tube, wherein in the cooking mode, the controller is configured to determine whether the pot is in position and properly weighted, and when the pot is in position, the drinking water supply unit is selectively actuated to dispense water from the drinking water tank through the drinking water outlet of the drinking water supplying apparatus, while at the same time, the drinking water valve and the food valve are opened to dispense a predetermined amount of water from the drinking water tank and a predetermined amount of food from the food storage directly into the pot through the drinking water output tube and the food valve respectively, the pot being arranged to be heated up by the heater to simultaneously heat said food and said water in said pot for a predetermined period of time.

2. The automatic cooking apparatus capable of supplying drinking water according to claim 1, wherein the controller is implemented by an electronic circuit and comprises a display screen and a control panel for allowing the user to enter at least one instruction to the controller.

3. An automatic cooking apparatus capable of simultaneously supplying drinking water and cooking food, comprising:

a drinking water supply unit for supplying drinking water and a cooking device for cooking food, the drinking water supply unit and the cooking device being arranged adjacently, wherein the cooking device is selectively operated for cooking and the drinking water supply unit is selectively operated for dispensing drinking water, the drinking water supply unit is capable of dispensing drinking water while simultaneously the cooking unit is operated for cooking, the drinking water supply unit comprising:

a drinking water tank supported in the drinking water supply unit for storing a predetermined amount of water, said drinking water tank being a self-contained structure not connected to external water supplying pipe;

a drinking water sensor disposed in the drinking water tank;

a drinking water output tube having a first end and a second end, the first end connecting to the drinking water tank;

a drinking water valve provided within the drinking water output tube; and a drinking water supplying apparatus connected to the drinking water tank, the drinking water supplying apparatus comprising at least one drinking water outlet solely for dispensing said drinking water out of said automatic cooking apparatus;

the cooking device comprising:

a food storage having a cavity for storing a predetermined amount of food and defining an accommodation space below said food storage;

a food sensor disposed in the food storage;

a food output member disposed under the food storage;

a food valve provided within the food output member; and a cooking unit, which comprises:

a pot provided directly underneath the food output member inside said accommodation space below said food storage for receiving the food directly from the food output member, the second end of the drinking water output tube being extended directly above the pot inside the accommodation space in such a manner that water from the drinking water tank is directly delivered to the pot via the drinking water output tube;

a pot sensor disposed under the pot to sense a weight of the pot;

a pot cover provided on top of the pot to selectively seal a space within the pot;

a heater provided under the pot within said accommodation space for heating the food and the water simultaneously inside the pot;

a controller electrically connected to the drinking water sensor, the food sensor, the pot sensor for inspecting whether the pot is in position, the drinking water valve, the food valve and the heater; and a pot cover actuator electrically connected to and controlled by the controller, wherein the pot cover actuator is connected to the pot cover and is used for actuating a pot cover to selectively open and close a space within the pot;

the controller is configured to operate the automatic cooking apparatus on at least one of a water supplying mode and a cooking mode, wherein said drinking water tank supplies the drinking water to said drinking water supply unit to dispense through the drinking water outlet while said drinking water tank supplies the drinking water to said pot via the drinking water output tube, wherein in the water supplying mode, the drinking water supply unit is dispenses water from the drinking water tank through the drinking water outlet of the drinking water supplying apparatus without passing through the drinking water output tube, wherein in the cooking mode, the controller is configured to determine whether the pot is in position and when the pot is in position, the drinking water supply unit is selectively actuated to dispense water from the drinking water tank through the drinking water outlet of the drinking water supplying apparatus, while at the same time, the drinking water valve and the food valve are opened to dispense a predetermined amount of water from the drinking water tank and a predetermined amount of food from the food storage directly into the pot through the drinking water output tube and the food valve respectively, the pot being arranged to be heated up by the heater to simultaneously heat said food and said water in said pot for a predetermined period of time.

4. The automatic cooking apparatus capable of supplying drinking water according to claim 3, wherein the pot cover actuator comprises a single-arm transmission mechanism, the pot cover being driven to move in an arc swing path by the pot cover actuator.

5. The automatic cooking apparatus capable of supplying drinking water according to claim 4, wherein the pot cover corresponding to an opening of the pot has a first hole connected with the drinking water output tube, and a second hole connected with the food output member.

6. The automatic cooking apparatus capable of supplying drinking water according to claim 3, wherein the pot cover actuator comprises a power transmission mechanism, the pot cover being driven to move vertically by the pot cover actuator.

7. The automatic cooking apparatus capable of supplying drinking water according to claim 3, wherein the controller is implemented by an electronic circuit and comprises a display screen and a control panel for allowing a user to enter at least one instruction to the controller.

* * * * *